United States Patent
Kawai et al.

[11] Patent Number: 6,115,567
[45] Date of Patent: Sep. 5, 2000

[54] SUPPORT PART, DEVELOPER CONTAINER, PROCESS CARTRIDGE AND ELECTROPHOTOGRAPHIC IMAGE FORMING APPARATUS

[75] Inventors: Tachio Kawai, Odawara; Hideki Sato, Hirosaki, both of Japan

[73] Assignee: Canon Kabushiki Kaisha, Tokyo, Japan

[21] Appl. No.: 08/887,288

[22] Filed: Jul. 2, 1997

[30] Foreign Application Priority Data

Jul. 4, 1996 [JP] Japan ................................. 8-174975
Jun. 26, 1997 [JP] Japan ................................. 9-170270

[51] Int. Cl.$^7$ .......................... G03G 15/08; G03G 15/00
[52] U.S. Cl. ......................................... 399/106; 399/263
[58] Field of Search .................................. 399/103, 104, 399/105, 106, 107, 254, 255, 256, 263

[56] References Cited

U.S. PATENT DOCUMENTS

| | | | |
|---|---|---|---|
| 5,134,441 | 7/1992 | Nagata et al. | 355/245 |
| 5,170,212 | 12/1992 | DeCecca | 399/103 |
| 5,374,977 | 12/1994 | Shiina et al. | 355/206 |
| 5,642,186 | 6/1997 | Michlin et al. | 399/107 |

FOREIGN PATENT DOCUMENTS 0758105 2/1997 European Pat. Off. .
7-253707 10/1995 Japan .

*Primary Examiner*—Joan Pendegrass
*Attorney, Agent, or Firm*—Gitzpatrick, Cella, Harper & Scinto

[57] ABSTRACT

A support part attached to a developer container used in an electrophotographic image forming apparatus includes a support portion for supporting one end of an agitating member for agitating developer contained in the developer container, a fitting portion fitted into a through hole formed in a frame of the developer container, a detent portion for preventing the support part from disengaging from the through hole, a seal member contacting portion for contacting a seal member for preventing developer from leaking from between the frame and the support part, and a driving force receiving portion for receiving a driving force for rotating the support part. In a direction intersecting with an axis of the support part, the detent portion is positioned inwardly of an outer peripheral surface of the seal member contacting portion.

34 Claims, 5 Drawing Sheets

SUPPORT PART, DEVELOPER CONTAINER, PROCESS CARTRIDGE AND ELECTROPHOTOGRAPHIC IMAGE FORMING APPARATUS

BACKGROUND OF THE INVENTION

1. Field of the Invention

The present invention relates to a support part, a developer container, a process cartridge and an electrophotographic image forming apparatus. The electrophotographic image forming apparatus is an image forming apparatus of type in which an image is formed on a recording medium by using an electrophotographic image forming system. The electrophotographic image forming apparatus may include an electrophotographic copying machine, an electrophotographic printer (for example, a laser beam printer, an LED printer and the like), an electrophotographic facsimile, and an electrophotographic word processor, for example. The "process cartridge" may incorporate therein an electrophotographic photosensitive member, and, a charge means, a developing means or cleaning means as a unit which can removably be mounted on an image forming apparatus, or may incorporate therein an electrophotographic photosensitive member, and, at least one of a charge means, a developing means or a cleaning means as a unit which can removably be mounted on an image forming apparatus, or may incorporate therein an electrophotographic photosensitive member and at least a developing means as a unit which can removably be mounted on an image forming apparatus.

2. Related Background Art

In the conventional electrophotographic image forming apparatuses using an electrophotographic image forming process, there have been proposed process cartridges integrally incorporating therein an electrophotographic photosensitive member and process means acting on the electrophotographic photosensitive member as a unit, which can removably be mounted on an image forming apparatus. By using such a process cartridge, since the maintenance of the apparatus can easily be performed by a user himself without any expert, and, thus, operability can be improved remarkably, such a process cartridge has been widely used in electrophotographic image forming apparatuses.

In such a process cartridge, for example, as shown in FIG. 7, a developing means includes a frame 50 constituting a developer container, and developer contained in the developer container is agitated by rotating an agitating member 51 and then is supplied to an electrophotographic photosensitive member. In this case, in order to permit rotation of the agitating member 51, a support member 52 is fitted into a through hole 50a formed in the frame 50 and one end of the agitating member 51 is secured to the support member 52, and a rotational force is applied to the support member 52 from outside of the frame to transmit the rotational force to the agitating member 51. A seal member 53 is disposed between the support member 52 and the frame 50 to prevent the developer from leaking through a gap between the support member 52 and the through hole 50a.

The support member 52 is generally formed by injection-molding synthetic resin and has a detent portion 52a for preventing the support member 52 from disengaging from the through hole 50a, a seal contacting portion 52b supported in the through hole 50a and contacting the seal member 53, and an enlarged portion 52c. Thus, as shown in FIG. 8, a mold (54a, 54b, 54c and 54d) used in the injection-molding is divided at mold portions 54b, 54c, for forming the seal contacting portion 52b disposed between the detent portion 52a and the enlarged portion 52c, and, after the resin is injected, the mold portions 52a to 54d are opened in the directions shown by the arrows in FIG. 8, thereby removing the molded support member.

SUMMARY OF THE INVENTION

The present invention aims to further improve the above-mentioned conventional technique.

An object of the present invention is to provide a support part having high sealing ability, a developer container using such a support part, a process cartridge using such a developer container, and an electrophotographic image forming apparatus using such a process cartridge.

Another object of the present invention is to provide a support part having no parting (separating) lines, a developer container using such a support part, a process cartridge using such a developer container, and an electrophotographic image forming apparatus using such a process cartridge.

A further object of the present invention is to provide a support part in which mold portions can be opened efficiently when the support part is formed, a developer container using such a support part, a process cartridge using such a developer container, and an electrophotographic image forming apparatus using such a process cartridge.

Another object of the present invention is to provide a support part in which a detent portion for preventing the support part from disengaging from a through hole of a frame is arranged inwardly of a peripheral surface of a seal contacting portion contacting with a seal member for preventing developer from leaking from between the frame and the support part, a developer container using such a support part, a process cartridge using such a developer container, and an electrophotographic image forming apparatus using such a process cartridge.

DETAILED DESCRIPTION OF THE PREFERRED EMBODIMENTS

Now, an embodiment of the present invention will be explained with reference to the accompanying drawings. First of all, a process cartridge having a developer container and an entire construction of an image forming apparatus using such a process cartridge will be described, and, then, the construction of a support member of the developer container will be described.

[Process Cartridge and Entire Construction of Image Forming Apparatus]

Figure 1:
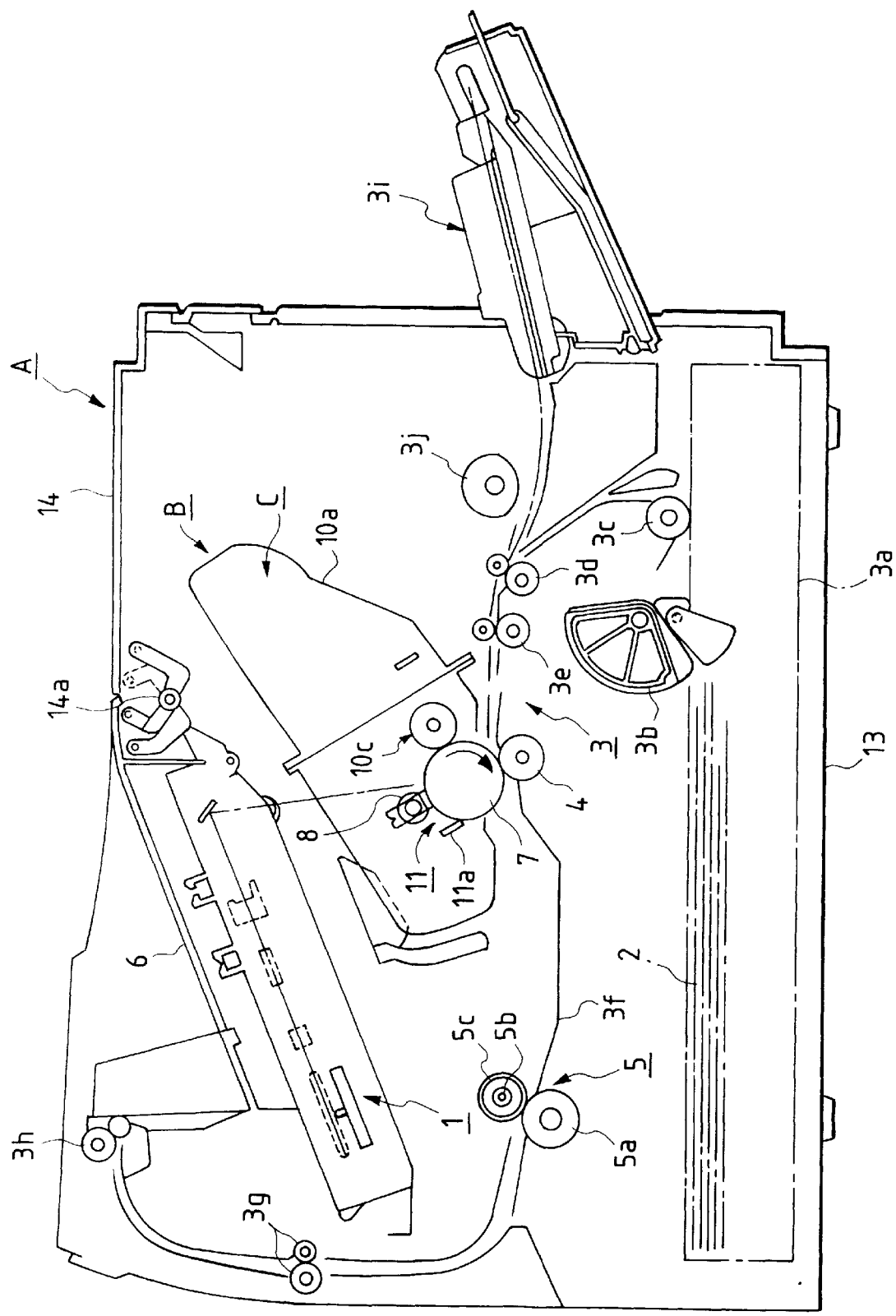
FIG. 1 is a schematic elevational view of an electrophotographic image forming apparatus according to an embodiment of the present invention.

As shown in FIG. 1, in an electrophotographic image forming apparatus (laser beam printer) A, a latent image is formed on a drum-shaped electrophotographic photosensitive member by projecting information light from an optical system 1 on the photosensitive member in response to image information and a latent image is developed with the developer (referred to as "toner" hereinafter) to form a toner image. Synchronously with the formation of the toner image, a recording medium 2 from a cassette 3a is conveyed by a convey means 3 comprised of a pick-up roller 3b, a supply roller 3c, a pair of convey rollers 3d and a pair of resist rollers 3e. Then, the toner image formed on the electrophotographic photosensitive member included in a process cartridge B is transferred onto the recording medium 2 by applying voltage to a transfer roller (transfer means) 4.

After the transferring of the toner image, the recording medium 2 is conveyed, through a convey guide 3f, to a fixing means 5 having a drive roller 5a and a fixing roller 5c including a heater 5b therein, where the transferred toner image is fixed to the recording medium 2 by applying heat and pressure to the recording medium. Thereafter, the recording medium 2 is discharged onto a discharge portion 6 by pairs of discharge rollers 3g, 3h.

Figure 2:
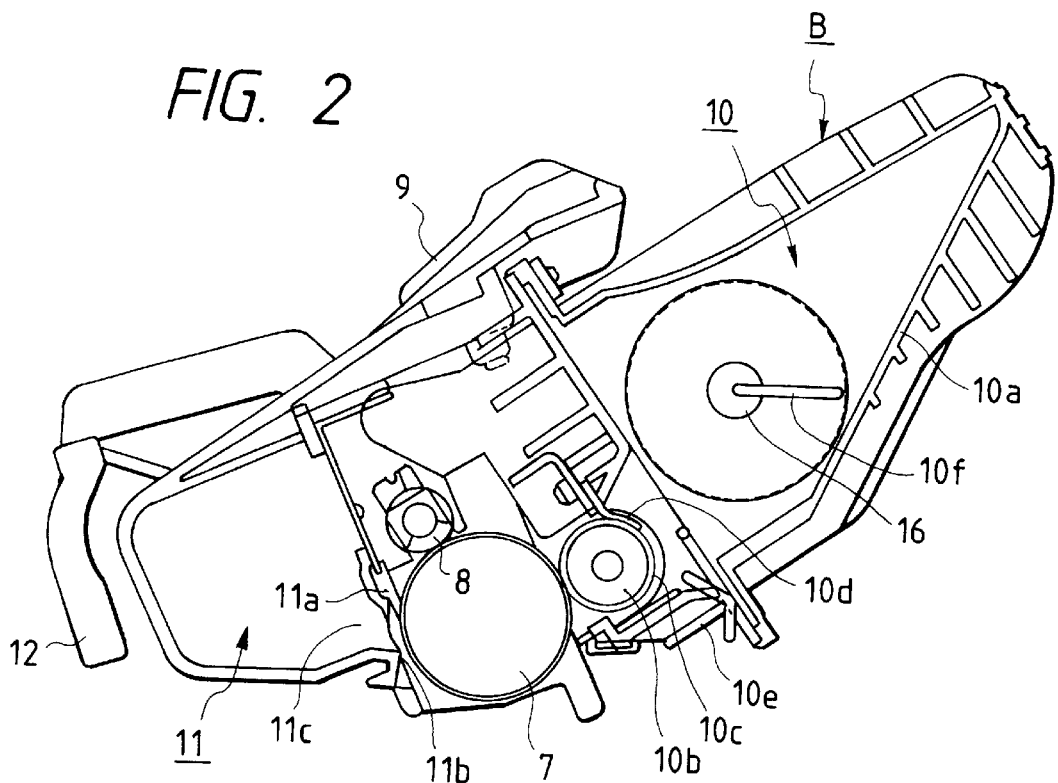
FIG. 2 is a schematic sectional view of a process cartridge.

The process cartridge B includes the electrophotographic photosensitive member and at least a toner (developer) container. As shown in FIG. 2, in the process cartridge B, a photosensitive drum (electrophotographic photosensitive member) 7 having a photosensitive layer is rotated, a surface of the photosensitive drum is uniformly charged by applying voltage to a charge roller (charge means) 8, a latent image is formed on the photosensitive drum by exposing the information light from the optical system 1 on the photosensitive drum through an exposure opening 9, and the latent image is developed by a developing means 10.

The developing means 10 is constituted by joining a toner frame 10a forming a toner container C to a developing frame 10e to which a developing roller 10c, including a magnet 10b therein and a developing blade 1d, are attached. When an image is formed, an agitating member 10f disposed within the toner frame 10a is rotated to supply toner in the container to the rotating developing roller 10c, where a toner layer is formed on the developing roller 10c by frictionally charging the toner by the developing blade 10e. The latent image is visualized as a toner image by transferring the toner from the toner layer onto the latent image on the photosensitive drum 7.

After the toner image was transferred to the recording medium 2 by applying voltage having a polarity opposite to that of the toner image to the transfer roller 4, residual toner remaining on the photosensitive drum 7 is removed by a cleaning means comprising a cleaning blade 11a for scraping residual toner from the photosensitive drum 7, a dip sheet 11b for gathering the scraped toner, and a waste toner container 11c for collecting the waste toner.

Incidentally, the above-mentioned various members including the photosensitive drum and the like are supported in a housing obtained by joining a toner/developing frame (obtained by welding the toner frame 10a and the developing frame 10e together) to a cleaning frame 12 holding the photosensitive drum 7 and the cleaning means 11, which housing can removably be mounted on a cartridge mounting means provided in a frame 13 of the image forming apparatus.

Figure 3:
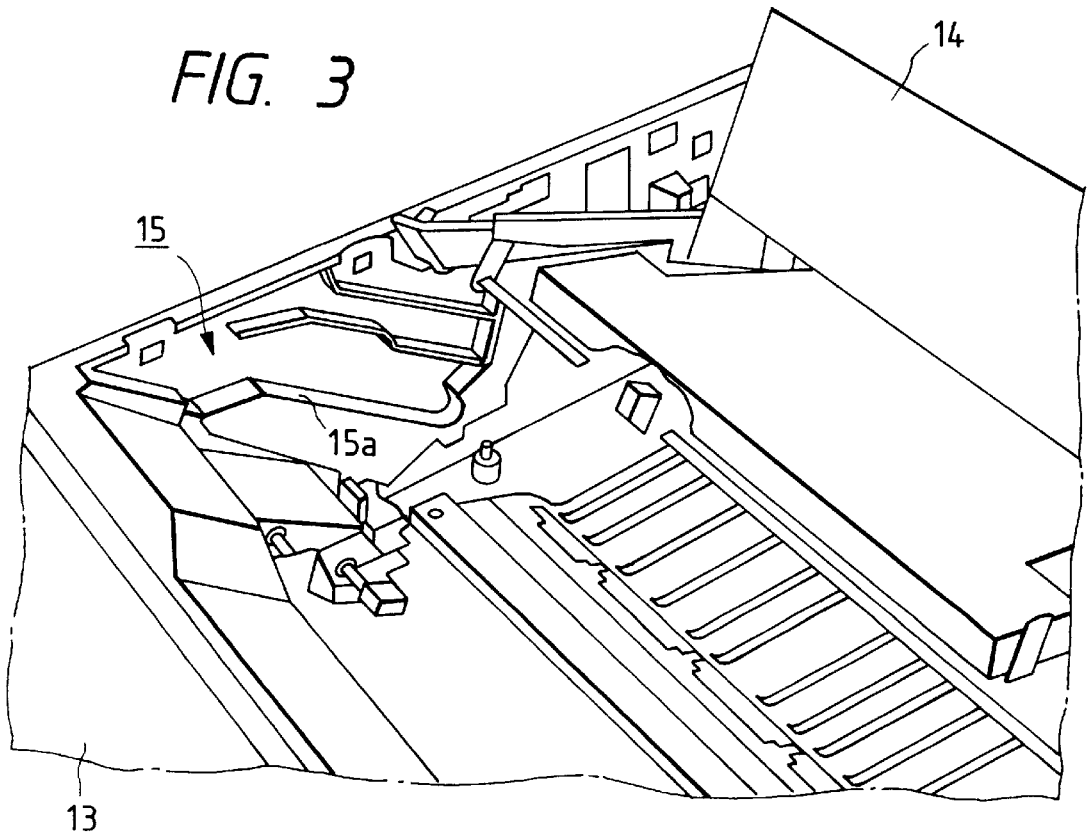
FIG. 3 is an explanatory view for explaining the mounting of the process cartridge.

Regarding the cartridge mounting means, when an opening/closing cover 14 is opened around a shaft 14a (FIG. 1), as shown in FIG. 3, a cartridge mounting space is exposed. In this cartridge mounting space, cartridge mounting guide portions 15 are provided on left and right side walls (only the left side wall is shown in FIG. 3) of the mounting space in an opposed relation. The left and right guide portions 15 have guide rails 15a for receiving the process cartridge B. On the other hand, the process cartridge B is provided at its both side surfaces with bosses (not shown) protruding outwardly from a rotation center position of the photosensitive drum 7. By inserting the bosses into the guide rails 15a and then by closing the opening/closing cover 14, the process cartridge B is mounted within the image forming apparatus A.

[Support Member (Support Part) of Developer Container (Toner Container)]

Now, the developer container (toner container) C applied to the process cartridge will be explained. The container C serves to support the agitating member 10f (disposed in the container) via a through hole 10a1 formed in the frame 10a of the container C and has a support member 16 for holding a seal member 17 between the support member and the frame 10a of the container C. The support member 16 has detent portions (projections) 16a for preventing the support member from disengaging from the container C, a fitting portion 16b supported by the container C, and a seal member contacting portion 16c contacted with the seal member. In a plane perpendicular to an axial direction of the support member 16, a maximum diameter defined by the detent portions 16a is smaller than an outer diameter of the seal member contacting portion 16c.

Here, a construction for supporting the agitating member 10f will be described. As mentioned above, the toner container C used in the developing means 10 includes therein the agitating member 10f acting on the toner. When the image is formed, the agitating member 10f is rotated to agitate the toner in the container. Thus, it is necessary to transmit a rotational force to the agitating member from the outside.

Figure 4:
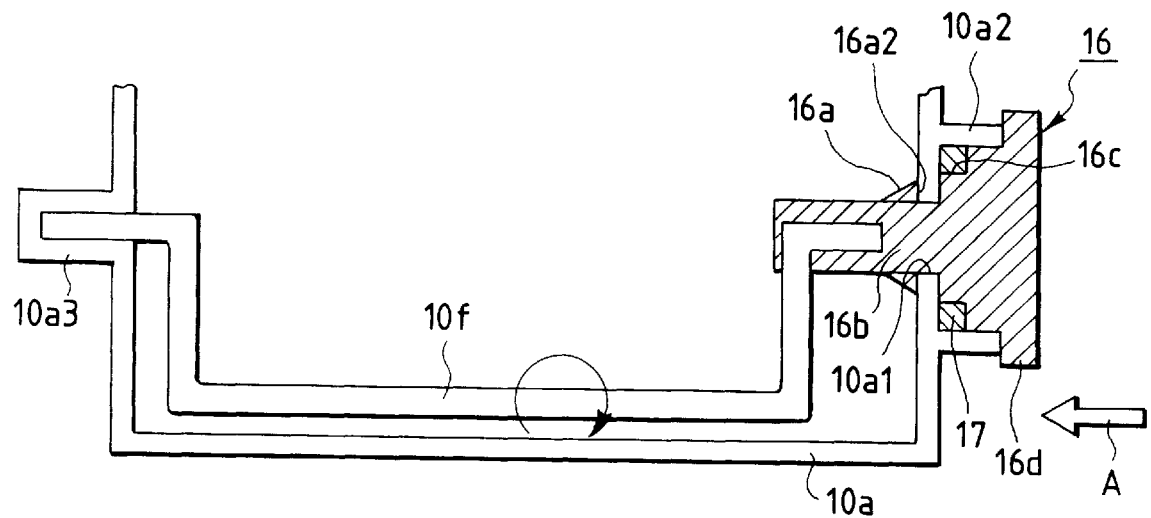
FIG. 4 is a explanatory view for explaining the construction of a support member (support part) of a toner (developer) container.

To this end, as shown in FIG. 4, the through hole 10a1 is formed in the side wall of the toner frame 10a and the support member 16, made of synthetic resin, is fitted into the through hole 10a1, and one end of the agitating member 10f (U-shaped rod) is attached to the support member 16 and the other end of the agitating member 10f is rotatably received in a recess 10a3 formed in the toner frame 10a. A first gear (not shown) meshed with a roller gear (not shown), for transmitting a rotational force to the developing roller 10c, is connected to the support member 16. During image formation, when the rotational force is transmitted to the developing roller 10c, the support member 16 is rotated by the rotational force from the first gear, thereby rotating the agitating member 10f. Further, in order to prevent the toner from leaking through the through hole 10a1, a ring-shaped flange 10a2 is formed around the through hole, and a seal member 17 (made of rubber or felt, for example) is disposed within the flange 10a2 between the frame 10a and the support member 16.

The support member 16 has the detent portions 16a having a radial dimension slightly greater than a diameter of the through hole 10a1 to prevent the support member from disengaging from the through hole 10a1 of the toner frame 10a, the fitting portion 16b fitting into and being supported by the through hole 10a1, a seal member contacting portion 16c contacting with the seal member 17, and a stepped cylindrical shape having a longitudinal axis directing toward a fitting direction to the through hole 10a1. Further, the support member is provided at its outer end with an enlarged driving force receiving portion 16d. In the illustrated embodiment, the first gear is engaged by a gear formed on the driving force receiving portion 16d. Thus, when the support member 16 is rotated in synchronism with the rotation of the developing roller 10c, the agitating member 10f is also rotated.

Incidentally, after the seal member 17 contacts the seal member contacting portion 16c, by snappingly and forcibly fitting the detent portions 16a into the through hole 10a1 from outside of the toner frame 10a, the support member 16 can be attached to the frame 10a.

Figure 5:
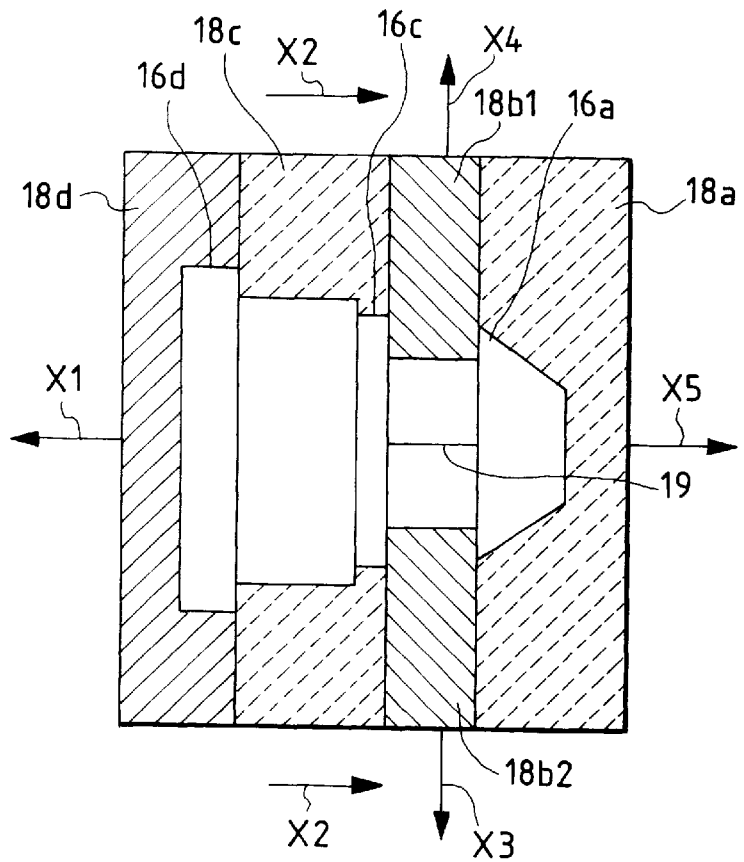
FIG. 5 is a sectional view of a mold for molding the support member (support part)

In the support member 16 according to the illustrated embodiment, the outer diameter of the seal member contacting portion 16c is greater than the maximum diameter defined by the detent portions 16a. Thus, as shown in FIG. 5, a mold for forming the support member 16 by injection-molding synthetic resin can be constituted by a first mold portion 18a for forming the detent portions 16a, second mold portions 18b1, 18b2 for forming the fitting portion 16b, a third mold portion 18c for forming the seal member contacting portion 16c and a fourth mold portion 18d for forming the enlarged driving force receiving portion 16d. When the mold is opened, the second mold portions 18b1, 18b2 for forming the fitting portion 16b, having a diameter smaller than those of the detent portions 16a, and the seal member contacting portion 16c must be divided or separated in an up-and-down direction. However, since the diameter of the seal member contacting portion 16c is greater than the maximum diameter defined by the detent portions 16a, the third mold portion 18c can be opened in a direction shown by the arrow in FIG. 5.

That is to say, as shown by the arrows in FIG. 5, the mold portion 18d for forming the enlarged driving force receiving portion 16d can be opened in a direction shown by the arrow X1, the mold portion 18c for forming the seal member contacting portion 16c can be opened in a direction shown by the arrow X2, the mold portions 18b1, 18b2 for forming the fitting portion 16b can be opened in directions shown by the arrows X4, X3, respectively, and the mold portion 18a for forming the detent portions 16a can be opened in a direction shown by the arrow X5.

Figure 6:
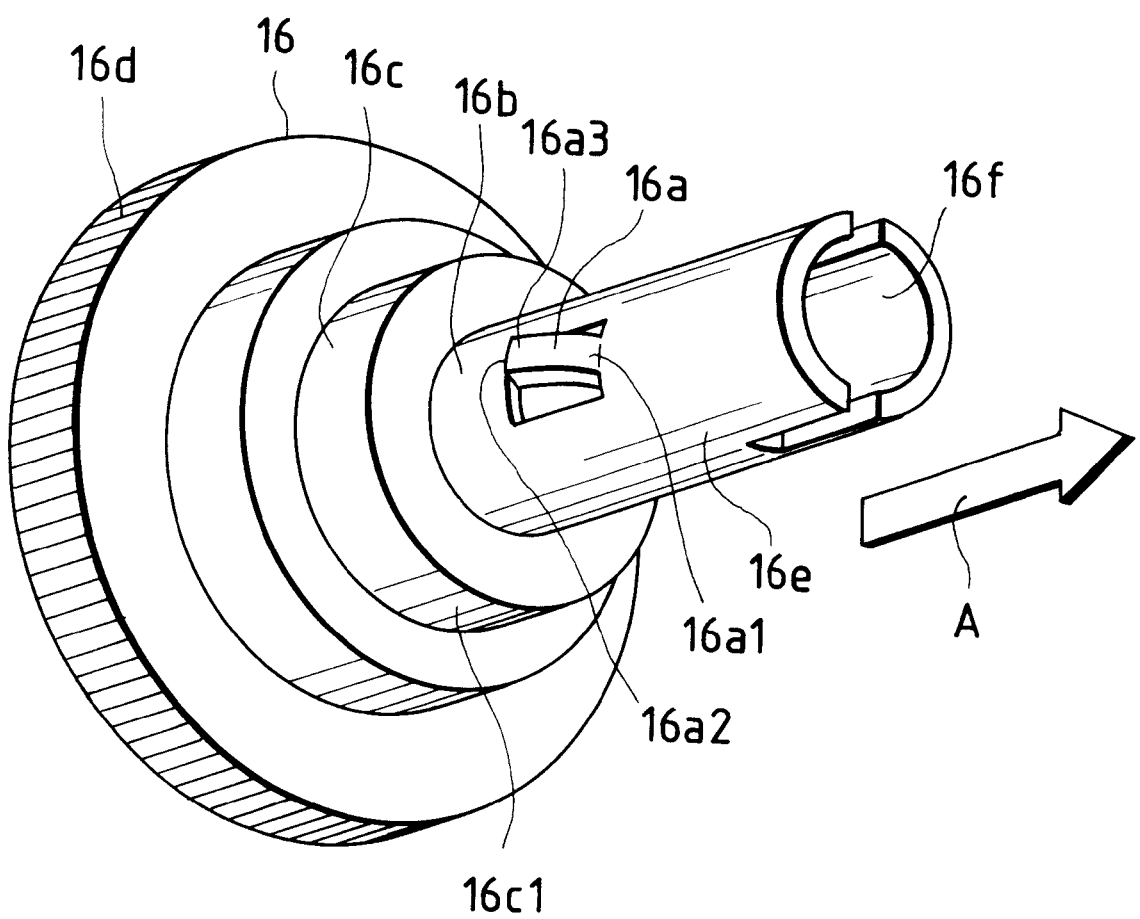
FIG. 6 is a perspective view of the support member (support part)
Figure 7:
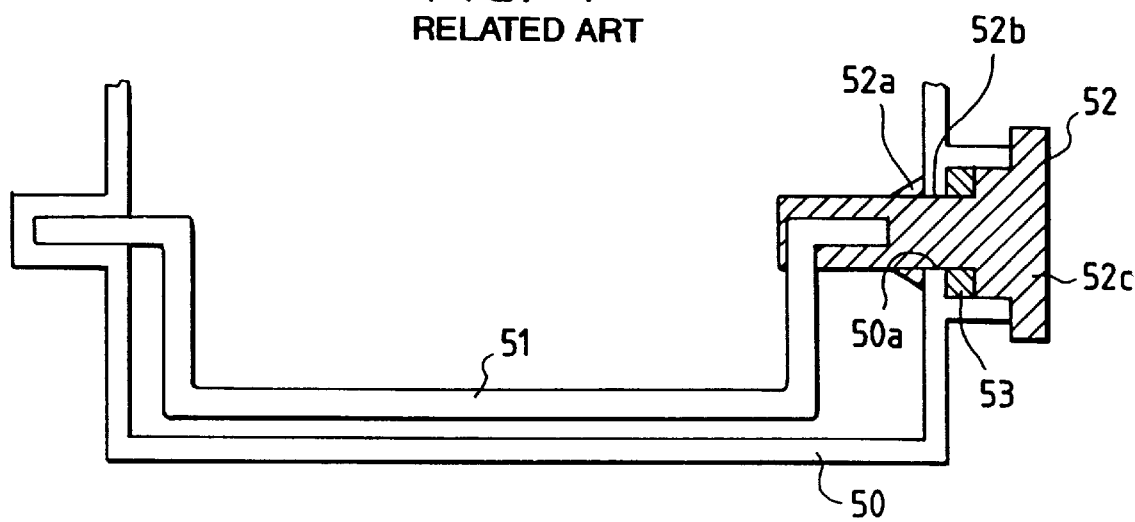
FIG. 7 is an explanatory view for explaining the construction of a support member of a conventional developer container.
Figure 8:
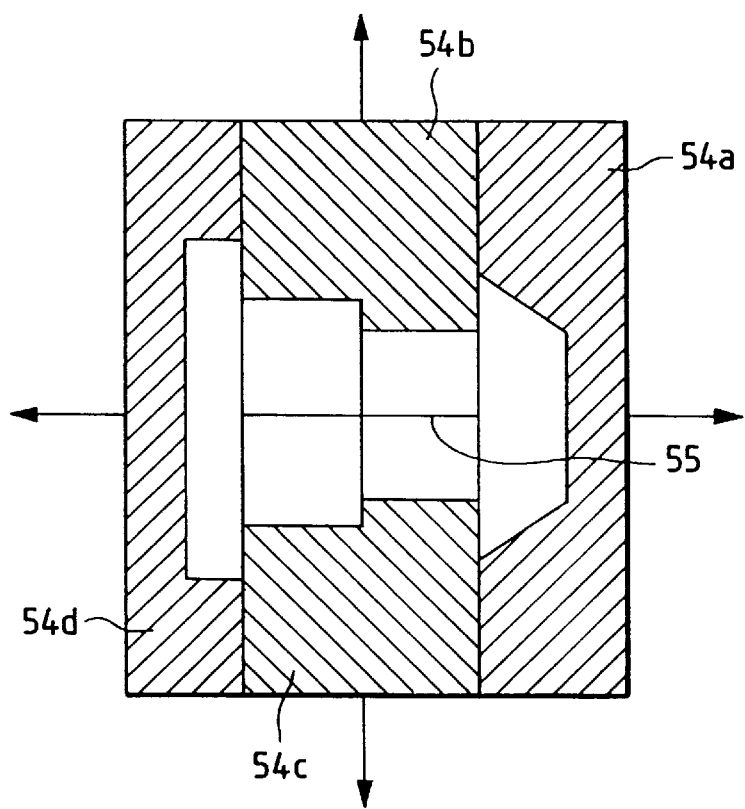
FIG. 8 is a sectional view of a conventional mold for molding the support member.

Now, the construction of the support member 16 will be fully described with reference to FIG. 6 which is a perspective view of the support member 16 shown in FIG. 4. In FIG. 6, a cylinder 16e has a support portion 16f for supporting one end of the agitating member 10f. The support portion 10f has an opening into which one end of the agitating member 10f can be inserted. The seal member contacting portion 16c has a cylindrical shape. The detent portions 16a are formed on an outer peripheral surface of the cylinder 16e in a diametrically opposed relation (only one of the detent portions is shown in FIG. 6). The detent portions 16a are formed as pawls protruding outwardly from the peripheral surface of the cylinder 16e.

Each detent portion 16a can be pivoted around its root or base end 16a1. That is to say, in the illustrated embodiment, the support member (support part) 16 is a one-piece part made of plastic and the pawls (detent portions) can be flexed by the elasticity of the plastic. When the support member 16 is inserted into the through hole 10a1 (in a direction shown by the arrow A) with the cylinder 16e becoming a leading end from outside of the frame 10a, the pawls are temporarily retarded into the cylinder 16e and then are returned to their initial or free conditions as shown in FIG. 6. As a result, tip ends 16a2 of the pawls abut against the frame 10a.

Accordingly, the fitting portion 16b of the support member 16 is fitted into the through hole 10a1 of the frame 10a, thereby attaching the support member to the frame 10a positively.

In an axial direction of the support member 16, from a distal end to a proximal end thereof, the support portion 16f, detent portions 16a, fitting portion 16b, the seal member contacting portion 16c and an enlarged driving force receiving portion 16d are arranged in order. Further, in the plane perpendicular to the longitudinal axis of the support member 16, the detent portions 16a are disposed within the outer peripheral surface of the seal member contacting portion 16c. More specifically, in a radial plane of a cylinder as the seal member contacting portion 16c, an outer end 16a3 of each pawl 16a as the detent portion is positioned radially inwardly of the peripheral surface 16c1 of the cylinder by about 0.2 mm to 3.0 mm. Further, each pawl 16a is inclined from the root 16a1 to the tip end 16a2 so that the tip end 16a2 (outer end surface 16a3) protrudes from the cylinder 16e more than the root. More particularly, in the illustrated embodiment, the outer diameter of the cylinder as the seal member contacting portion 16c is selected to be about 10.2 mm and the diameter of the circle defined by the tip ends 16a2 (outer end surfaces 16a3) of the pawls 16a as the detent portions is selected to be about 9.7 mm. The center of the circle is positioned on the longitudinal axis or rotational center line of the support member 16.

Although, the support member (support part) 16 can be formed from synthetic resin, such as polyacetal, polycarbonate, polyamide or polybutylene terephtalate, the support member may be formed from other materials.

As mentioned above, since the third mold portion 18c forms the seal member contacting portion 16c, there is no parting line on the seal member contacting portion 16c.

Accordingly, since there is no danger of generating any gap between the seal member contacting portion 16c and the seal member 17, the toner can surely be prevented from leaking through any gap between the seal member contacting portion and the seal member. Thus, by using the support member 16 according to the illustrated embodiment, the sealing ability of the toner container C can be improved (although parting lines 19 are formed on the fitting portion 16b, such parting lines do not negatively affect the sealing ability of the container).

In the illustrated embodiment, while an example that the toner container C used in the developing means 10 was explained, the toner container according to the present invention can be applied to another application (for example, to the waste toner container 11c of the cleaning means 11). In this case, a toner acting member is disposed within the waste toner container and the support member is suitably used for supporting such a toner acting member. Further, while an example of the toner container C being used in a process cartridge was explained, such a toner container can be used as a toner container of a developing means and/or a toner container of a cleaning means in an image forming apparatus in which the developing means and the cleaning means are directly attached to a body of the image forming apparatus (i.e., process means are not contained in a cartridge).

Further, in the illustrated embodiment, while the laser beam printer was explained as the electrophotographic image forming apparatus, the electrophotographic image forming apparatus may be embodied as an electrophotographic copying machine or an electrophotographic facsimile.

According to the above-mentioned embodiment, when the support member is formed by injection-molding, the seal member contacting portion can be formed without separating or dividing the mold portion in a circumferential direction of the seal member contacting portion, so that any parting lines are not formed on the seal member contacting portion. Thus, the sealing ability of the seal member can be prevented from deteriorating.

Further, according to the illustrated embodiment, since the outer diameter of the seal member contacting portion of the support member attached to the toner container is greater than the maximum diameter defined by the detent portions, the parting lines can be eliminated from the seal member contacting portion, thereby preventing the sealing ability of the seal member from being deteriorating.

As mentioned above, according to the present invention, the sealing ability of the developer container can be improved.

What is claimed is:

1. A support part attached to a developer container used in an electrophotographic image forming apparatus, comprising:
   a support portion for supporting one end of an agitating member for agitating a developer contained in the developer container;
   a fitting portion fitted into a through hole formed in a frame of the developer container;
   a detent portion for preventing the support part from disengaging from said through hole;
   a seal member contacting portion for contacting a seal member for preventing the developer from leaking from between said frame and the support part; and
   a driving force receiving portion for receiving a driving force for rotating the support part;
   wherein in a direction intersecting with an axis of the support part, said detent portion is positioned inwardly of an outer peripheral surface of said seal member contacting portion.

2. A support part according to claim 1, wherein said support portion, said detent portion, said fitting portion, said seal member contacting portion, and said driving force receiving portion are arranged sequentially from one end to the other end of the support part in an axial direction of said support part.

3. A support part according to claim 2, wherein said support portion has an opening into which one end of the agitating member can be inserted.

4. A support part according to claim 2, wherein said seal member contacting portion has a substantially cylindrical shape, said detent portion being constituted as a pawl protruding outwardly from a peripheral surface of a cylinder defining said support portion, and said pawl being capable of rocking around its root.

5. A support part according to claim 4, wherein the support part is a one-piece member made of a plastic material.

6. A support part according to claim 5, wherein an outer end of said pawl as said detent portion is positioned inwardly of the outer peripheral surface of said cylinder by about 0.2 mm to 3.0 mm in a radial direction of said substantially cylindrical seal member contacting portion.

7. A support part according to claim 6,
   said detent portion comprising a pair of pawls on said fitting portion for permitting said support part to engage the through hole and for preventing said support part from disengaging from the through hole,
   said pawls protruding outwardly from said support portion in an initial position,
   said pawls being rockable about their base ends to become temporarily retarded into said fitting portion in response to said support part being inserted into the through hole to permit passage of the support part therethrough and then returning to the initial position after the passing through the through hole so that tip ends of said pawls abut against the developer container frame to prevent the support part from disengaging from the through hole,
   said pawls being inclined from their base ends to their tip ends,
   wherein the outer end of each pawl is positioned radially inwardly of the peripheral surface of said seal member containing portion in a radial plane of the cylinder of said seal member contacting portion by about 0.2 mm to 3.0 mm.

8. A support part according to claim 1, wherein said support portion has an opening into which one end of the agitating member can be inserted.

9. A support part according to claim 1, wherein said seal member contacting portion has a substantially cylindrical shape, said detent portion being constituted as a pawl protruding outwardly from a peripheral surface of a cylinder defining said support portion, and said pawl being capable of rocking around its root.

10. A support part according to claim 9, wherein the support part is a one-piece member made of a plastic material.

11. A support part according to claim 10, wherein an outer end of said pawl as said detent portion is positioned inwardly of the outer peripheral surface of said cylinder by about 0.2 mm to 3.0 mm in a radial direction of said substantially cylindrical seal member contacting portion.

12. A developer containing container used in an electrophotographic image forming apparatus comprising:
   a. a developer containing portion for containing a developer;
   b. an agitating member for agitating the developer contained in said developer containing portion;
   c. a support part including a support position for supporting one end of said agitating member, a fitting portion fitted into a through hole formed in a frame of said developer containing portion, a detent portion for preventing the support part from disengaging from said through hole, a seal member contacting portion for contacting a seal member for preventing the developer from leaking from between said frame and the support part, and a driving force receiving portion for receiving a driving force for rotating the support part, in a direction intersecting with an axis of the support part, said detent portion is positioned inwardly of an outer peripheral surface of said seal member contacting portion, and the support part being attached to said frame in a condition that said support portion supports one end of said agitating member and said fitting portion is fitted into said through hole; and
   d. said seal member.

13. A developing containing container according to claim 12, wherein said support portion, said detent potion, said fitting portion, said seal member contacting portion, and said driving force receiving portion are arranged sequentially from one end to the other end of the support part in an axial direction of said support part.

14. A developer containing container according to claim 13, wherein said support portion has an opening into which one end of said agitating member can be inserted.

15. A developer containing container according to claim 13, wherein said seal member contacting portion has a substantially cylindrical shape, said detent portion being constituted as a pawl protruding outwardly from a peripheral surface of a cylinder defining said support portion, and said pawl being capable of rocking around its root.

16. A developer containing container according to claim 15, wherein the support part is a one-piece member made of a plastic material.

17. A developer containing container according to claim 16, wherein an outer end of said pawl as said detent portion is positioned inwardly of the outer peripheral surface of said cylinder by about 0.2 mm to 3.0 mm in a radial direction of said substantially cylindrical seal member contacting portion.

18. A developer containing container according to claim 12, wherein said support portion has an opening into which one end of said agitating member can be inserted.

19. A developer containing container according to claim 12, wherein said seal member contacting portion has a substantially cylindrical shape, said detent portion being constituted as a pawl protruding outwardly from a peripheral surface of a cylinder defining said support portion, and said pawl being capable of rocking around its root.

20. A developer containing container according to claim 19, wherein the support part is a one-piece member made of a plastic material.

21. A developer containing container according to claim 20, wherein an outer end of said pawl as said detent portion is positioned inwardly of the outer peripheral surface of said cylinder by about 0.2 mm to 3.0 mm in a radial direction of said substantially cylindrical seal member contacting portion.

22. A process cartridge which can removably be mounted on an electrophotographic image forming apparatus, comprising:

a. an electrophotographic photosensitive member;
  b. process means for acting on said electrophotographic photosensitive member; and
  c. a developer container including a developer containing portion for containing a developer, an agitating member for agitating the developer contained in said developer containing portion, a support part including a support portion for supporting one end of said agitating member, a fitting portion fitted into a through hole formed in a frame of said developer containing portion, a detent portion for preventing the support part from disengaging from said through hole, a seal member contacting portion for contacting with a seal member for preventing developer from leaking from between said frame and the support part, and a driving force receiving portion for receiving a driving force for rotating the support part, in a direction intersecting with an axis of the support part, said detent portion is positioned inwardly of an outer peripheral surface of said seal member contacting portion, and the support part being attached to said frame in a condition that said support portion supports one end of said agitating member and said fitting portion is fitted into said through hole, and
  d. said seal member.

23. A process cartridge according to claim 22, wherein said support portion, said detent portion, said fitting portion, said seal member contacting portion, and said driving force receiving portion are arranged sequentially from one end to the other end of the support part in an axial direction of said support part.

24. A process cartridge according to claim 23, wherein said support portion has an opening into which one end of said agitating member can be inserted.

25. A process cartridge according to claim 23, wherein said seal member contacting portion has a substantially cylindrical shape, said detent portion being constituted as a pawl protruding outwardly from a peripheral surface of a cylinder defining said support portion, and said pawl being capable of rocking around its root.

26. A process cartridge according to claim 25, wherein the support part is a one-piece member made of a plastic material.

27. A process cartridge according to claim 26, wherein an outer end of said pawl as said detent portion is positioned inwardly of the outer peripheral surface of said cylinder by about 0.2 mm to 3.0 mm in a radial direction of said substantially cylindrical seal member contacting portion.

28. A process cartridge according to claim 27,
  said detent portion comprising a pair of pawls on said fitting portion for permitting said support part to engage the through hole and for preventing said support part from disengaging from the through hole,
  said pawls protruding outwardly from said support portion in an initial position,
  said pawls being rockable about their roots to become temporarily retarded into said fitting portion in response to said support part being inserted into the through hole to permit passage of the support part therethrough and then returning to the initial position after the passing through the through hole so that tip ends of said pawls abut against the developer container frame to prevent the support part from disengaging from the through hole,
  said pawls being inclined from their roots to their tip ends,
  wherein the outer end of each pawl is positioned radially inwardly of the peripheral surface of said seal member containing portion in a radial plane of the cylinder of said seal member contacting portion by about 0.2 mm to 3.0 mm.

29. A process cartridge according to claim 22, wherein said support portion has an opening into which one end of said agitating member can be inserted.

30. A process cartridge according to claim 22, wherein said seal member contacting portion has a substantially cylindrical shape, said detent portion being constituted as a pawl protruding outwardly from a peripheral surface of a cylinder defining said support portion, and said pawl being capable of rocking around its root.

31. A process cartridge according to claim 30, wherein the support part is a one-piece member made of a plastic material.

32. A process cartridge according to claim 31, wherein an outer end of said pawl as said detent portion is positioned inwardly of the outer peripheral surface of said cylinder by about 0.2 mm to 3.0 mm in a radial direction of said substantially cylindrical seal member contacting portion.

33. A process cartridge according to claim 22, wherein said process means include at least one of a charge member for charging said electrophotographic photosensitive member, a developing member for developing a latent image formed on said electrophotographic photosensitive member, and a cleaning member for removing residual developer remaining on said electrophotographic photosensitive member.

34. An image forming apparatus onto which a process cartridge is removably mounted for forming an image on a recording medium, comprising:

a. developer containing container having an electrophotographic photosensitive member, process means for acting on said electrophotographic photosensitive member, a developer container including a developer containing portion for containing a developer, an agitating member for agitating the developer contained in said developer containing portion, a support part including a support portion for supporting one end of said agitating member, a fitting portion fitted into a through hole formed in a frame of said developer containing portion, a detent portion for preventing the support part from disengaging from said through hole, a seal member contacting portion for contacting with a seal member for preventing developer from leaking from between said frame and the support part, and a driving force receiving portion for receiving a driving force for rotating the support part, in a direction intersecting with an axis of the support part, said detent portion is positioned inwardly of an outer peripheral surface of said seal member contacting portion, and the support part being attached to said frame in a condition that said support portion supports one end of said agitating member and said fitting portion is fitted into said through hole, and said seal member; and b. conveying member for conveying a recording medium.

* * * * *